Figure 1:
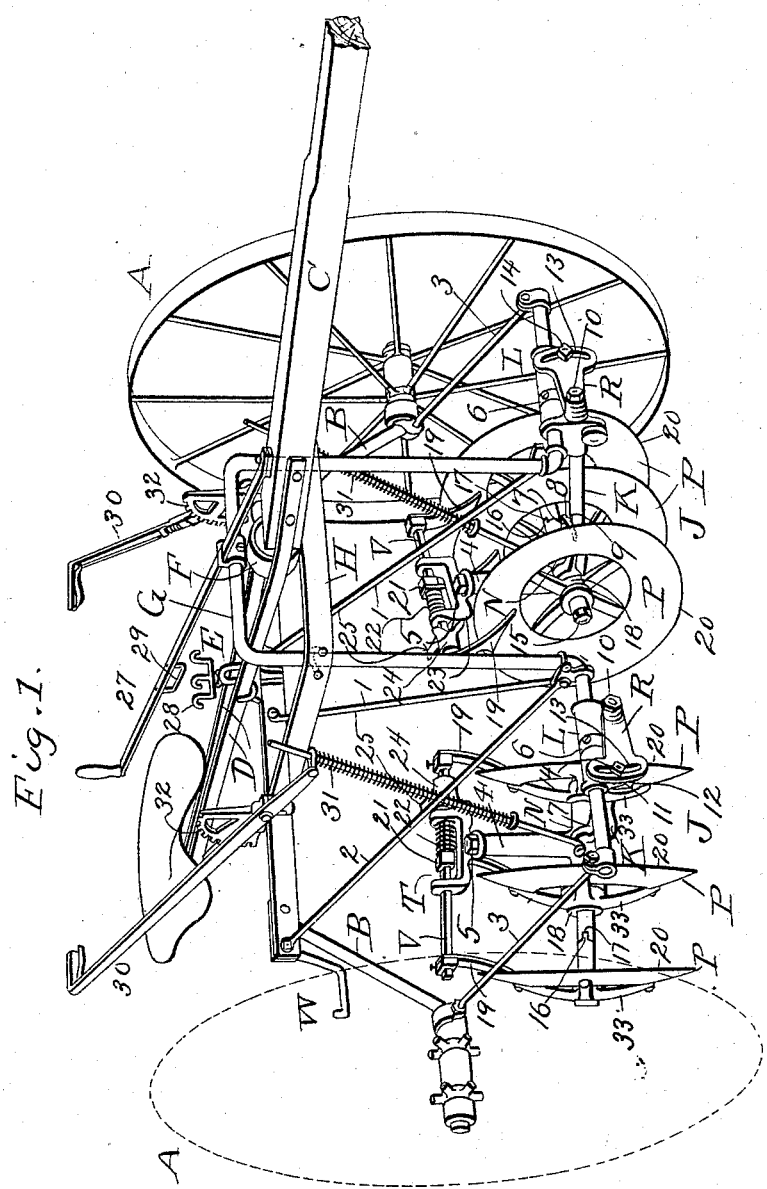

(No Model.) 2 Sheets—Sheet 1.

L. E. WATERMAN.
DISK CULTIVATOR.

No. 541,906. Patented July 2, 1895.

Witnesses
Geo. Burdick
D. E. Burdick

Inventor
Lewis E. Waterman
per John G. Manahan
Attorney (No Model.) 2 Sheets—Sheet 2.
L. E. WATERMAN.
DISK CULTIVATOR.
No. 541,906. Patented July 2, 1895.
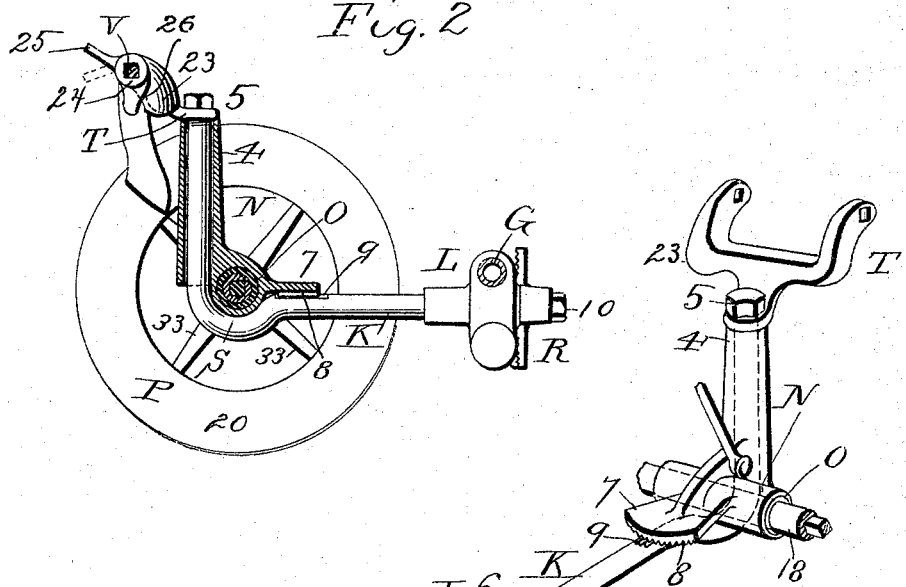
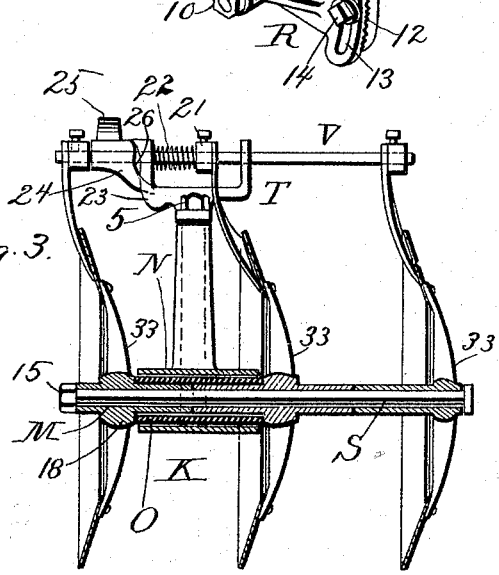
Witnesses.
Cele Burdine
D E Burding
Inventor.
Lewis E. Waterman
per John G. Manahan
Attorney.

UNITED STATES PATENT OFFICE.

LEWIS E. WATERMAN, OF MOLINE, ASSIGNOR TO THE ROCK ISLAND PLOW COMPANY, OF ROCK ISLAND, ILLINOIS.

DISK CULTIVATOR.

SPECIFICATION forming part of Letters Patent No. 541,906, dated July 2, 1895.

Application filed February 1, 1895. Serial No. 536,955. (No model.)

*To all whom it may concern:*

Be it known that I, LEWIS E. WATERMAN, a citizen of the United States, residing at Moline, in the county of Rock Island and State of Illinois, have invented certain new useful Improvements in Disk Cultivators; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention pertains to certain improvements in disk cultivators, a more detailed explanation of which is hereinafter contained. The chief employment of this implement is in the cultivation of corn, in which use it is necessary to move the cultivator blades, whether they be shovels or disks, more or less laterally to and from the row of corn, to avoid cutting out or covering the irregular hills of corn. With the ordinary shovel cultivators, this movement of the shovels is edgewise of the latter, and a matter of comparative ease; but, in the use of disk cultivators this lateral movement is diagonal across the cutting edges of the disks, and, therefore, it is impracticable to move the disk gangs laterally without changing their inclination. In my invention, to overcome this difficulty, and to render the necessary lateral movement of the disks as convenient as possible, I devise a rigid frame, supported upon two carrying wheels, to which frame the disk gangs are rigidly, though adjustably, attached. This frame at the center of the axle is pivoted to the rear of the tongue, so as to be readily oscillated laterally to change the direction of the implement. Foot rests on the axle, near the respective carrying wheels, and a hand lever, pivoted at its front end on the tongue frame, co-operate to coincidently deflect both the frame of the machine and the disk gangs. The mechanism by which this is accomplished forms one part of my present invention.

The second improvement herein consists in constructing the disk with an open center and an outer cutting rim of about four inches in width, carried by four radial spokes, the inner ends of which terminate in a small hub.

It is well known, to those familiar with the use of disks, that most frequently the accumulation of earth, in the concave side thereof, begins at and around the center of the disk, gradually extending therefrom to the periphery of the disk. The resistance of the earth against the face of the disk does not extend to the center of the latter, and there is therefore nothing in the center of the usual disk to prevent this initiative clogging.

In my invention the pressure from the earth will extend the width of the cutting rim of the disk, and, in most instances, will tend to keep such rim clear of accumulations.

The third improvement in my organization is the ready change of the implement from a "throw in" to a "throw out" cultivator, and vice versa. By the removal of a single nut at the rear of each disk gang, the latter may be instantly interchanged.

As arranged in Figure 1, the implement is a "throw in" cultivator; but it is obvious that, if the gang were made to change places, the implement would be a "throw out" cultivator.

The fourth element of my invention is the simple method employed of connecting the disk gangs to the frame of the machine, and yet retaining the essential quality of varying the angle of said gangs with the line of movement, as may be desired.

The fifth department of my invention has reference to the novel and efficient method employed for adjusting the disk gangs laterally and in a vertical plane, or tilting either end of said gangs, so as to vary or regulate the depth of cut of each disk, with reference to the others in the same gang.

I attain the above mentioned objects by the construction illustrated in the accompanying drawings, in which—

Fig. 1 is a perspective of a machine embodying my invention. Fig. 2 shows details of the disk gangs, and the mode of their attachment to the frame of the machine, and the means of accomplishing the duplex adjustment aforesaid. Fig. 3 is a section through the hubs of the disk gangs.

Similar letters or numerals refer to similar parts in the different views.

A A are the carrying wheels.

B is the axle.

C is the tongue, or pole, which is pivotally connected to the center of the axle B as follows: Two hounds D D, suitably bolted at their forward ends to the sides of the rear end of said tongue, and, extending rearwardly from the tongue, are pivotally attached at E to the upper surface of the center of the axle B, and, projecting beyond said pivotal point, are utilized at their rear extremities as a support for the driver's seat. At the rear end of the tongue proper, and between the hounds D, is seated on said tongue, transversely of the latter, a friction roller F.

G is the arch, the central horizontal portion of which passes over the roller F and over the hounds D. The arch G descends from a locality at each side of the hounds D, to the plane of the center of the disk gangs, where its ends are oppositely turned outwardly in a horizontal position.

A horizontal bar, or three-sided yoke H, is rigidly attached at its rear extremities to the axle B, a short distance each side of the center of the latter, and, extending forward, is looped around the vertical portions of the arch G, passing horizontally under the roller F. The tread of said pulley is wide enough to rest between the horizontal portions of the yoke H and arch G, and, operating as a friction roller for said parts, in the hereinafter described oscillations of the frame of the machine. The vertical portions of the arch G are attached by suitable clips to the inside of the yoke H, at the respective front angles of the latter. Truss rods 1 extend from near the center of the axle B to the inner lower angle of the arch G. Diagonal truss rods 2 in like manner extend from the outer ends of the horizontal portion of said axle B to the same point on the arch G, and like rods 3 extend from the axle B, at the inner end of the hub of the carrying wheels, to the outer extremities, respectively, of the arch G. There is thus constituted a compact frame, consisting of the axle B, yoke H, and arch G, pivotally connected to the pole C, and adapted, as a unitary structure, to be oscillated laterally, in reference to said pole.

The disk gangs J are seated slightly in the rear of the horizontal portion of the arch G, and respectively connected thereto as follows: The beam K is adjustably attached at its front end to a cross head L, adjustably seated on the horizontal portion of the arch G, and, extending rearward therefrom, passes under the axle of the disk gang, and then upward through the box N. The box N is seated loosely around the sleeve O, and is provided at its rear end with a vertical tubular collar 4, through which the rear end of the beam K is passed upward. The upper end of said beam is furnished with a thread and a nut 5 seated thereon. This nut constitutes the only attachment of the disk gangs K, and, by the removal of said nut, the disk gangs may be readily lifted from the beam K, and interchanged as before stated. The sleeve O, referred to, is seated upon the elongated hubs of the disks P, and rotates loosely in the box N. The length of said sleeve and of said box gives the disk gangs a long and efficient bearing in said box. The disks P are constructed of a narrow cutting rim 20, about four inches in width, supported on four radial spokes 33 seated in the hub 18, leaving the open center M.

The cross head L is seated adjustably on the arch G by being partially cut out at its center, and the insertion in said interval of a collar 6, seated in said open interval on the arch G by means of a suitable set screw. By this means the disk gangs can be adjusted laterally so as to be widened or narrowed, and their relative position regulated as may be desired.

The angle of the disk gangs, with reference to the line of movement, is adjusted by means of a segmental horizontal projection 7 formed on the front side of the box N, and provided on its under surface with radial corrugations 8, which are adapted to engage longitudinal corrugations 9, formed on the upper surface of the beam K, underneath said projection 7. By loosening the bolt 5 the disk gang J can be set at any angle desired, and held in said position by replacing and tightening said nut.

The lateral tilt, before mentioned, of the disk gangs is effected by means of an outwardly projecting arm R, seated rigidly on the front end of beam K, contiguous to the front side of the cross head L. This rigidity is effected by having the front end of the beam K of a square formation, and the aperture in the arm R, through which said beam K passes, of a like formation, the arm being secured on said beam by the nut 10. The outer end of the arm R is of a segmental formation, and is provided on its rear surface with radial corrugations 11, which engage corresponding corrugations 12, formed on a downward projection integral with cross head L. The outer end of the arm R has a vertical segmental slot 13, and a bolt 14 projected through a suitable opening in the lower portion of the cross head L, and through said slot serves to hold the corrugations 11 and 12 in any desired relation, thereby giving the axis of the disk gang J any desired lateral tilt. The corrugations 11 may be formed on the front side of arm R, and a corrugated washer used to engage therewith, if desired.

The central opening through hubs 18 of the disks P is of square formation, and a square sided bolt S is passed through said hubs, and a nut 15 at the other extremity of said bolt serves to hold all of the disks compactly together. To further assure the unitary quality of the disk gangs, projections 16 and recesses 17 can be formed upon the contiguous ends of the hubs 18 of the disks, and such formation will be essential to hold the disks unitedly, if they are used upon a round bolt.

A bracket T is seated on the upper end of collar 4 of beam K, and held in place by the nut 5, and serves to support the scraper bar V, with scrapers 19 adapted to engage the concave side of the rim 20 of the disks P. An adjustable collar 21 is seated on the bar V between the supporting ends of the bracket T, and a coiled spring 22, seated on said scraper bar between said collar and one of the ends of said bracket, serves to throw the scrapers 19 into contact with the rims 20 and to hold said scrapers against said rims with a yielding force when the scrapers are in operation thus relieving said scrapers from any irregularity in the surface, or rotation of said disks.

A cam-like formation 23 is given to the outside of one end of the bracket T, and a rotating collar 24 is seated adjacently on the bar V, and provided with a spur 25 adapted to be engaged with the foot of the operator. The inner end of the collar 24 has also a cam-like formation 26, and, by the operator placing his foot on the spur 25, and rotating collar 24 and cams 23 and 26 into engagement, withdraws the scrapers 19 from the rim 20 where such cams hold said scrapers out of action so long as may be desired. By the contrary partial rotation of the collar 24, the cam lock can be broken, when the spring 22 will carry the bar V with its attached scrapers to the disks.

A hand lever 27 capable, at its rear portion, of being sprung vertically, is pivoted at its front end upon the rear portion of the tongue C, and extended backward therefrom to within convenient reach of the driver. Said lever is suitably attached, back of its pivotal front end, to the center of the horizontal portion of the arch G, and, by its oscillation laterally, the carrying wheels A and disk gangs J are coincidently deflected to the right or left, by reason of the rigid unitary character of all of the operative parts of the machine. These movements are aided by coincident pressure from the driver's feet on foot rests W, formed on the lower portion and near the ends of axle B.

A transverse series of inverted hooks 28, seated on the frame of the machine over the center of axle B, by being optionally engaged with the loop 29 on lever 27, serves to hold the frame and disk gangs in any selected position. This is specially advantageous on side hill cultivation. The lever 27 through beam K exerts a leverage on the gangs J in the control of the latter.

Hand levers 30 are suitably fulcrumed on the frame of the machine, and attached at their forward ends by rods to the disk gangs J for the purpose of raising the latter, or, through the medium of the spring 31, and locking quadrant 32, holding said disk gangs down to their work with any desired degree of pressure.

By the above construction an implement is organized which contains all of the various capabilities requisite to its successful practical operation. The susceptibility to instant change of direction; the necessary adjustments as to direction and depth of cut, the transposition from a "throw out" to a "throw in" gang, and the ready and general control of the machine under variant circumstances, are all provided for, and in the simplest and most compact and durable form. The disks, being set near to and in line with the tread of the carrying wheels, insures an even cultivation of the ground. The open center M of the disks reduces the liability of the disks to gather earth to a minimum.

By the employment of the box N and beam K, I am enabled to dispense with the usual small arch seated on the disk gangs, as a means of adjusting the latter.

What I claim as my invention, and desire to secure by Letters Patent of the United States, is—

1. The combination of the gangs J, axle B, supporting wheels A, pole C pivotally attached to said axle, arch G connected to said axle, beam K connecting said arch and said disk gangs, levers 27 attached to said pole at its forward end, and intermediately to said arch, and adapted to be locked in different positions to said axle B, whereby said wheels A and disk gangs J are coincidently deflected; substantially as shown, and for the purpose specified.

2. The combination of the arch G, cross head L seated thereon, beam K provided with nut 5, arm R seated on said beam, and projected laterally therefrom, and provided with corrugations 11, and segmental slot 13, bolt 14, adapted to optionally unite cross head L and the slotted end of arm R at various points in slot 13, and thereby adjust the inclination of said disk gangs laterally; substantially as shown, and for the purpose described.

3. The combination of the arch G, disk gangs J, box N seated thereon, and provided with collar 4, and corrugated projections 7, beam K provided with corrugations 9, and nut 5, and suitably connected at its forward end to said arch, whereby said disk gangs are adjustably held at any desired angle with the movement of the machine, and are readily removed and interchanged, substantially as shown, and for the purpose described.

4. In a disk cultivator, the combination of the suitably supported axle B, pole C pivotally attached thereto, arch G, truss rods 1, 2 and 3, connecting said arch with said axle B, disk gangs J beam K, connecting said arch and said disk gangs, and means, substantially as shown, for deflecting said arch, and thereby coincidently imparting a changed direction to said axle and disk gangs, for the purpose specified.

5. The combination of the arch G, the disk gangs J, placed in the rear of the horizontal portion of said arch, the beam K suitably attached at its forward end to said arch, and provided with longitudinal corrugations 9, the box N seated on said disk gang, and on the rear end of said beam, and provided with corrugations 8 adapted to engage said corrugations 9, and means, substantially as shown, for uniting said parts, for the purpose specified.

6. The combination of a suitably supported arch G, cross head L adjustably seated thereon, adjustable collar 6 seated within said cross head on said arch, beam K attached at its front end to said cross head, and the disk gang J, connected to the rear end of said beam, substantially as shown, and for the purpose described.

7. The combination of a suitably supported arch G, beam K adjustably attached, at its forward end, to said arch, and provided at its rear end with nut 5, disk gangs J and boxes N seated on said gangs, respectively, and provided with collar 4, whereby said gangs are readily removed and interchanged, for the purpose mentioned.

8. The combination of the bracket T provided with cam edge 23, bar V supported thereby, and provided with scrapers 19, collar 21 seated on said bar, spring 22 seated between said collar and said bracket, and semi-rotating collar 24 provided with spur 25, and cam edge 26; substantially as shown, and for the purpose described.

In testimony whereof I affix my signature in presence of two witnesses.

LEWIS E. WATERMAN.

Witnesses:
JOHN G. MANAHAN,
JAMES H. WARD.